United States Patent [19]

Amada et al.

[11] Patent Number: 4,543,652

[45] Date of Patent: Sep. 24, 1985

[54] TIME-DIVISION SWITCHING UNIT

[75] Inventors: Eiichi Amada, Kokubunji; Hiroshi Kuwahara, Kodaira; Hirotoshi Shirasu, Yokohama; Taihei Suzuki; Takashi Morita, both of Kodaira, all of Japan

[73] Assignee: Hitachi, Ltd., Tokyo, Japan

[21] Appl. No.: 517,697

[22] Filed: Jul. 27, 1983

[30] Foreign Application Priority Data

Oct. 4, 1982 [JP] Japan .................... 57-173219
Oct. 27, 1982 [JP] Japan .................... 57-187429

[51] Int. Cl.⁴ .......................................... H04Q 11/04
[52] U.S. Cl. .......................................... 370/66; 370/58
[58] Field of Search ....................... 370/66, 100, 58

[56] References Cited

U.S. PATENT DOCUMENTS 4,131,763 12/1978 Herschtal ......................... 370/66
4,206,322 6/1980 Lurtz ................................. 370/66
4,371,962 2/1983 Zeitraeg ........................... 370/100

Primary Examiner—Douglas W. Olms
Assistant Examiner—Wellington Chin
Attorney, Agent, or Firm—Antonelli, Terry & Wands

[57] ABSTRACT

A time-division switching unit for connecting a desired channel of a desired one of a plurality of input highways to a desired channel of a desired one of a plurality of output highways is disclosed. A frame synchronization circuit of the time-division switching unit variably delays signals of the input highways within one channel period, writes the signals to a speech memory for each channel, modifies write addresses to the speech memory to attain frame synchronization, extracts frame synchronization signals of the respective highways from the input and output of the speech memory, and controls the amount of delay within one channel period and the amount of address modification by the extracted synchronization signals.

15 Claims, 14 Drawing Figures

| ADDRESS | CONTENTS |
|---|---|
| 0 | HWY 0 CH 0 |
| 1 | HWY 1 CH 0 |
| 2 | HWY 2 CH 0 |
| 3 | HWY 3 CH 0 |
| 4 | HWY 4 CH 0 |
| 5 | HWY 5 CH 0 |
| 6 | HWY 6 CH 0 |
| 7 | HWY 7 CH 0 |
| 8 | HWY 0 CH 1 |
| 9 | HWY 1 CH 1 |
| 10 | HWY 2 CH 1 |
| 1022 | HWY 6 CH 127 |
| 1023 | HWY 7 CH 127 |

| ADDRESS | CONTENTS |
|---|---|
| 0 | HWY 0 CH 127 |
| 1 | HWY 1 CH 60 |
| 2 | HWY 2 CH 115 |
| 3 | HWY 3 CH 29 |
| 4 | HWY 4 CH 40 |
| 5 | HWY 5 CH 75 |
| 6 | HWY 6 CH 93 |
| 7 | HWY 7 CH 4 |
| 8 | HWY 0 CH 0 |
| 9 | HWY 1 CH 61 |
| 10 | HWY 2 CH 116 |
| 1022 | HWY 6 CH 92 |
| 1023 | HWY 7 CH 3 |

FIG. 13

| | | ADDRESS |
|---|---|---|
| HWY0 | 0TH BYTE | 0 |
| HWY0 | 1ST BYTE | 1 |
| | | ( |
| HWY0 | 31ST BYTE | 31 |
| HWY1 | 0TH BYTE | 32 |
| HWY1 | 1ST BYTE | 33 |
| | | ( |
| HWY1 | 31ST BYTE | 63 |
| | | ( |
| HWY7 | 31ST BYTE | 255 |

TIME-DIVISION SWITCHING UNIT

BACKGROUND OF THE INVENTION

The present invention relates to a time-division switching unit, and more particularly to a construction of time-division switching unit in which each frame has one or a plurality of time-division multiplexed input and output PCM highways having a plurality of channels so that a desired channel of a desired input highway is connected to a desired channel of a desired output highway.

A time-division multiplexed PCM signal transmission path has been widely used in switching and transmission. For example, switching in a time-division switching system is effected by exchanging voice or data transmitting time slots between time-division multiplexed PCM highways or on one highway. The time-division switch unit exchanges those channels.

The time-division switching unit is usually controlled by a processor or similar control unit connected thereto. Since the switching system is usually comprised of a plurality of time-division switching elements, it is necessary to transmit control information among the processors which control the respective time division switching units in order to operate the time-division switching units as the switching system.

In one method of control information transmission, some channels of the time-division highway are used. For example in ITT (International Telephone and Telegraph Corp.) 1240 switching system, two channels are allocated to one call so that a speech signal and the control information are transmitted using the same channels. However, since this method uses two channels per call, a utility efficiency of the time-division highway is low.

In order to resolve the above drawback, it has been proposed to fixedly allocate some channels of the highway to the control information to effect communication among the processors. This method is useful to a distributed control type switching system having processors one for each time-division switching units but it requires means for effectively transmitting and receiving the control information between the time-division switching unit and the processor which controls the time-division switching unit.

In the switching unit of the time-division switching system of this type, it is necessary that a start position of a frame in each input highway is synchronized with a frame synchronization signal supplied to the time division switching unit in order to exchange the time slots (frame synchronization).

In the prior art system, a channel synchronization buffer memory and a frame synchronization buffer memory are required for each input highway in order to synchronize the frame. A time-division switching system which shares the frame synchronization buffer memory with memory means of the time-division switching unit to reduce the memory and the unit is disclosed in Japanese Laid-Open patent application No. 48-66707. In the disclosed system, after the channel synchronization of the input highways, a phase difference between the frame phase of the input highway and the frame synchronization signal is detected as the number of channel periods and a write address of the memory means is modified by that number to synchronize the frames. In this method, the frame synchronization is attained without the frame synchronization buffer memory. However, in order to synchronize the channels and detect the phase difference between the frame phase of the input highway and the reference frame synchronization signal, a frame synchronization signal detector is required for each input highway, and a circuit scale of the synchronization circuit is large because the channel synchronization and the frame synchronization are separately controlled.

A synchronous digital communication system in which a transmitting station and a receiving station are controlled by clocks having the same frequency is desirable as a communication system in transmitting the control information among the processors. Such a communication system has been widely used in the fields of switching network and inercomputer communication. The communication is effected through wired or wireless transmission paths. It is usual that a received waveform includes a phase jitter due to a variation of a delay time of the transmission path by a temperature change, a variation of a power supply of a repeater unit, a crosstalk and a noise. On the other hand, it is necessary to latch an input digital signal by an internal clock in order to use the received data in the receiving station. In order to avoid a data error due to the phase jitter, it is necessary to latch the input digital signal at a time point which assures no influence by the phase jitter and sufficient stability of the input signal.

As methods for eliminating the influence by the phase jitter, "A Configuration of Bit Phase Synchronization Circuit for Synchronized Networks" by Sugihara et al, 1980 National Convention Record of the Institute of the Electronics and Communication Engineers of Japan, No. 2021, and "Line Variation Compensation System for Synchronized PCM Digital Switching" disclosed in U.S. Pat. No. 3,839,599 to Satyan G. Pitroda et al have been known. In those systems, a transition point of the input digital signal is detected to control a clock to latch the input signal. In the former system, a maximum acceptable range of the phase jitter is narrow, that is, one quarter of a data transmission frequency and a circuit scale is large (14 flip-flops and 17 gates). The latter method is effective to a slowly varying jitter but it cannot follow a fastly varying jitter such as a pattern jitter.

SUMMARY OF THE INVENTION

It is an object of the present invention to provide an improved switching system having a plurality of time-division switching units which is simple in construction and economic.

It is another object of the present invention to provide a time-division switching unit which does not require many channels to transmit control information with an addition of a simple circuit and which has a coupling unit for efficiently exchanging the control information between a control unit (processor) for controlling the time-division switching unit and the time-division switching unit.

It is a further object of the present invention to provide a time-division switching unit which has a frame synchronization circuit capable of attaining channel synchronization and frame synchronization by a single control circuit and a bit synchronization circuit of a simple construction having a wide acceptable range of phase jitter and capable of following a wide range of jitter varying speed.

In order to achieve the above objects, in accordance with the present invention, there is provided a time-division switching unit in which time-division multiplexed signals of a plurality of channels including control information transmitting channels from a plurality of input highways are stored in a speech path memory (first memory means) and a write address and a read address of the memory are controlled so that a desired channel of a desired input highway is connected to a desired channel of a desired one of a plurality of output highways. A bit synchronization circuit is provided for each of the input highways and an output of the bit synchronization signal is supplied to a serial-to-parallel converter through a variable delay which can delay an input signal within one channel period. An output of the serial-to-parallel converter is time-division multiplexed and then stored in the memory means. The address of the memory means is determined by an output of a reference counter which counts reference clock signals for switching operation and a write control circuit for the memory means modifies the address determined by the output of the reference counter by a frame synchronization circuit in order to effect the frame synchronization. The frame synchronization circuit comprises a plurality of counters provided one for each of the plurality of input highways, a coincidence circuit for sequentially checking coincidence between the output of the reference counter and the outputs of the plurality of counters, a frame synchronization signal detector for detecting a frame synchronization signal from the input highway multiplexed signals, a counter control circuit activated by the outputs of the coincidence circuit and the frame synchronization signal detector to hold a count thereof when the output of the reference counter and the output of the selected counter are equal and increments the count when they are not equal, and delay control means for controlling a delay of the variable delay means by a portion of the outputs of the counters.

In a preferred embodiment of the time-division switching unit of the present invention, the plurality of time-division multiplexed channels of the input highways include data channels for transmitting the control information as well as speech channels, a control circuit for transmitting and receiving the control information is provided for reading out the control information transmitted from the input highways from the memory means and writing new control information into the memory means. The control circuit comprises an input buffer memory, a first buffer input/output control circuit for detecting a channel position of the control information in the output of the memory means by a portion of the output of the reference counter and writing the control information from the input highway to a predetermined position of the input buffer memory, an output buffer memory, a second buffer input/output control circuit for adding the control information stored in the output buffer memory to a selected channel position of the output of the memory means by a portion of the output of the reference counter, and an interface circuit for coupling the input buffer memory, the output buffer memory and an external processor through an address bus and a data bus.

BRIEF DESCRIPTION OF THE DRAWINGS

The foregoing and other objects and features of the present invention will be understood from the following detailed description when take in connection with the accompanying drawings, in which:

FIG. 13 shows signal status in input and output buffer memories of FIG. 12.

DESCRIPTION OF THE PREFERRED EMBODIMENT

Figure 1:
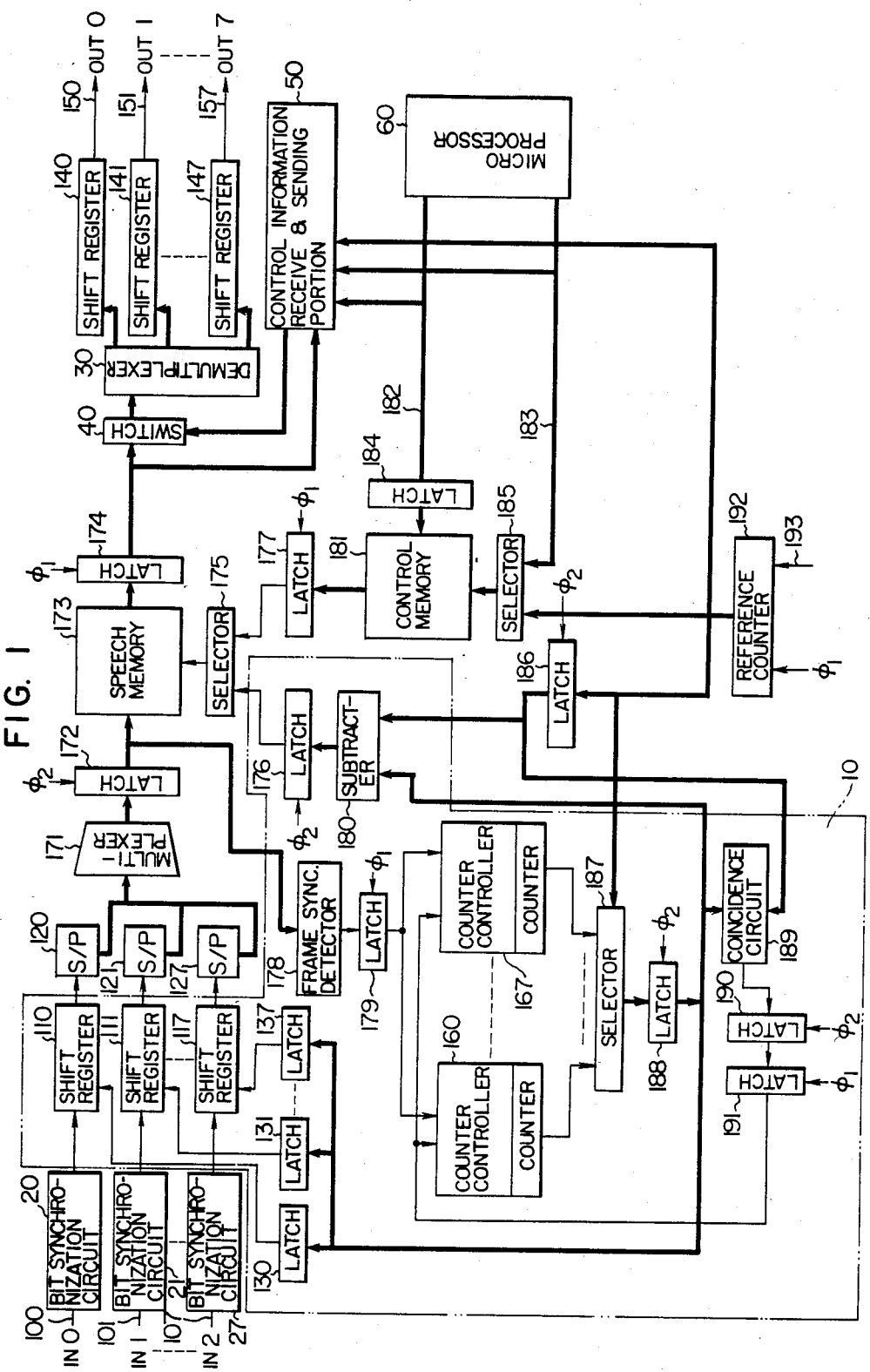
FIG. 1 is a block diagram of a configuration of one embodiment of the time-division switching unit of the present invention.
Figures 2, 3A, 3B:
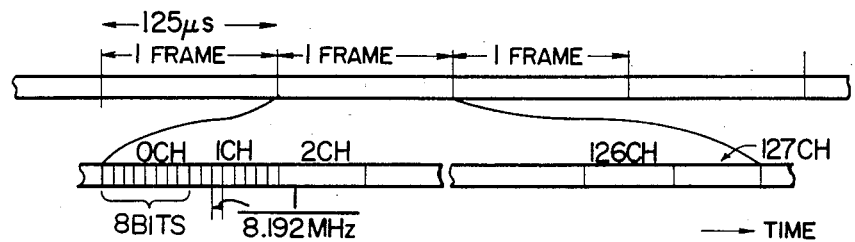
FIG. 2 shows a format of a highway signal transmitted through a highway of the embodiment of FIG. 1, FIGS. 3A and 3B illustrate storage status of words in a speech memory in the embodiment of FIG. 1.

Referring to FIG. 1, time-division multiplexed signals IN0, IN1, . . . IN7 are received through one of eight highways 100, 101, . . . 107, respectively, and they are supplied to bit phase synchronization circuits 20, 21, . . . 27, thence to serial-to-parallel conversion shift registers 120, 121, . . . 127 through variable delay shift registers 110, 111, . . . 117 in a frame synchronization circuit 10. Each of the time-division multiplexed signals is formatted as shown in FIG. 2 in which 128 channels of information are time-division multiplexed in a time interval of one frame (125 $\mu s = 1/8$ KHz) and each channel comprises 8-bits NRZ serial pulses. Accordingly, a bit rate of the highway is 8,192 Mb/s.

The signals converted by the serial-to-parallel conversion shift registers 120, 121, . . . 127 to the parallel signals are multiplexed by a multiplexer 171 and an output thereof is written into a speech memory (memory means) 173 through a latch circuit 172. The speech memory 173 has a memory capacity of $8 \times 128 = 1024$ words for storing one frame of digital information of the eight time-division multiplexed signals.

Write control to the speech memory 173, that is, write address specification is done by a reference counter 192 and the frame synchronization circuit 10. The counter 192 is a 10-bit counter which is counted up by a clock $\phi_1$ of 8.192 MHz and reset by a frame synchronization signal 193. Accordingly, the count of the counter 192 changes from 0 to 1023 in one frame of time interval (125 $\mu s$). Thus, low order three bits of the counter 192 specify one of the eight highways and the high order seven bits specify an order of channels in one frame. When the frame synchronization is exactly effected, the words are stored in the speech memory 173 as shown in FIG. 3A. The eight bits (word) of the i-th channel of the signal INj of the highway j are stored at the address $8i+j$ ($0 \leq j \leq 7$).

Read control to the speech memory 173, that is, read address specification is done by a control memory 181. The address $8i+j(0 \leq j \leq 7)$ of the control memory 181 contains a value $8k+l(0 \leq l \leq 7)$. By specifying the address $8i+j$ by the reference counter 192, the digital information of the k-th channel of the signal INl of the input highway is read as the i-th channel signal of the signal OUTj of the output highway (150, 151, . . . 157). The signal is read out in parallel at a frequency of 8.192 MHz and supplied to shift registers 140, 141, . . . 147 through a latch circuit 174. The shift registers 140, 141, . . . 147 convert the parallel output signals of the speech memory 173 to serial signals and compensate for readout time differences of the speech memory 173 for the respective highways so that timings of the signals on the output highways 150, 151, . . . 157 coincide.

A block 50 is a circuit for receiving the control information on a specified channel of the highway signal and inserting new control information to a specified channel. The control information is used to control a controller 60 which controls the time-division switching unit and communicate with a controller of other time-division switching unit.

The time-division switching unit described above may be used as a switching system for telephone and data communication. In the illustrated example, it has a function of $1024 \times 1024$ matrix switching system. By combining the switching unit described above, a larger scale of switching system is provided. This is described in U.S. Pat. No. 4,093,827.

The present invention is characterized by the bit phase synchronization circuits 20, 21, . . . 27, the frame synchronization circuit 10 and the control circuit 50 shown in FIG. 1. The configurations and the operations of the respective circuits are explained below in detail.

The frame synchronization circuit 10 is first explained.

The input signals IN0, IN1, . . . IN7 from the highways include waveform distortions and jitters due to the characteristics of the transmission lines, but they are compensated by the bit phase synchronization circuits 20, 21, . . . 27 which produce bit phase-synchronized signals. (The bit phase synchronization circuits will be explained hereinlater.) The frame phases of the respective highways are different from each other. The phase difference ranges from several bit periods to several tens channel periods. On the other hand, in order to construct the time-division switching unit, the signals must be written such that the address of the speech memory 173, the highway and the channel have the relation as shown in FIG. 3A.

The respective highways usually have the frame synchronization signals. The frame synchronization signal may be a selected bit in one frame or a synchronization pattern inserted to a selected channel in one frame. In the following description, the latter method is used and the synchronization pattern is inserted to the channel 0 of the input highway.

The frame phase synchronization circuit 10 comprises variable delay shift registers 110, 111, . . . 117 each having a variable delay time between 0 and 7 bit periods, a synchronization detector 178 for detecting a synchronization pattern from the output of the multiplexer 171, counters one for each of the input highways 101, 102, . . . 107, control circuit 160, 161, . . . 167 for the counters, a selector 187 for sequentially selecting the outputs of the counters, and a coincidence circuit 189 for comparing the output of the selected counter with the high order bits of the reference counter 192 which produces the reference signal to the operation of the time-division switching unit. The counter control circuits 160, 161, . . . 167 are activated by the outputs of the coincidence circuit 189 and the frame synchronization detector 178, and the delays of the variable delay shift registers 110, 111, . . . 117 are determined by portions of the outputs of the selected counters. The frame synchronization circuit is now explained.

The reference counter 192 is a 10-bit counter and the output thereof is supplied to the speech memory 173 as an address thereto through the latches 176 and 186. Accordingly, when the input highways are in frame synchronization state, the signals of the respective channels of the respective highways are sequentially written into the speech memory 173 as shown in FIG. 3A by the address specification by the counter 192. However, if the signals are out of frame synchronization, the ordered relation as shown in FIG. 3A is not attained and the word in one channel may be distributed to two addresses. In the present embodiment, the phase shifts of the frame synchronization of the respective highways are corrected by the variable delay shift registers 110, 111, . . . 117 so that they are integral multiples of the channel period (1/128 frame), the differences between the corrected frame synchronization signals of the respective highways and the frame synchronization signal in the counter 192 are detected, the differences are subtracted from the output of the counter 192 by a subtractor 180, and the resulting differences are used as the write address signals to the speech memory 173.

For example, if the channel synchronized signals are written into the memory without the correction of the frame synchronization as shown in FIG. 3B, a one-channel period of delay occurs in the highway 0, a 68-channel period of delay occurs in the highway 1, a 99-channel period of delay occurs in the highway 2 and so on. The number of channels of delay is detected and it is subtracted from the output of the reference counter 192 and the resulting difference is used as the write address. In this manner, the relation between the address and the highway channel signal (word) as shown in FIG. 3A is attained. This is essentially equivalent to the frame synchronization of the respective highways.

More specifically, the coincidence circuit 189 compares the low order seven bits of the counters in the synchronization control circuits 160, 161, . . . 167 with the high order seven bits of the reference counter 192 and produces an H-level output when they are equal. On the other hand, the synchronization detector 178 detects the coincidence between the output of the latch 172 and the synchronization pattern. When the output of the coincidence circuit is H-level, the synchronization control circuits 160–167 refer the output of the synchronization detector 178 and hold the contents thereof if the synchronization detector 178 detects the synchronization pattern and increment the counts if it does not detect the synchronization pattern. Let us assume that the shifts in the respective channels are those shown in FIG. 3B and the highway 0 is considered. Since the synchronization pattern of the highway 0 appears in the latch 172 when the count of the reference counter 192 is "0000001001", the low order seven bits of the counter in the synchronization control circuit 160 stop at "0000001". This count is subtracted from the high order seven bits of the reference counter 192 (if a difference is negative, a MOD 128 operation is carried out) and the resulting difference is used as the write address to the speech memory 173. In this manner, the channel signals having the relation as shown in FIG. 3B can be written into the speech memory 173 with the relation as shown in FIG. 3A and the frame synchronization is attained. If the synchronization is not attained through the change of the low order seven bits of the counters in the counter control circuits 160-167 in the range of 0 to 127, the write timing to the speech memory is not in synchronism with the start point of the channel. In this case, the delays of the variable delay shift registers 110-117 must be changed. The delays are controlled by the high order 3 bits of the counters in the counter control circuits 160-167 and they vary within the range of 0 to 7 bit periods. Since one channel comprises 8 bits, the synchronization is attained with the delay of 0-7 bits. Accordingly, the 10-bit counter is used to attain the frame synchronization taking the seven bits for the channel adjustment into consideration.

Figure 4:
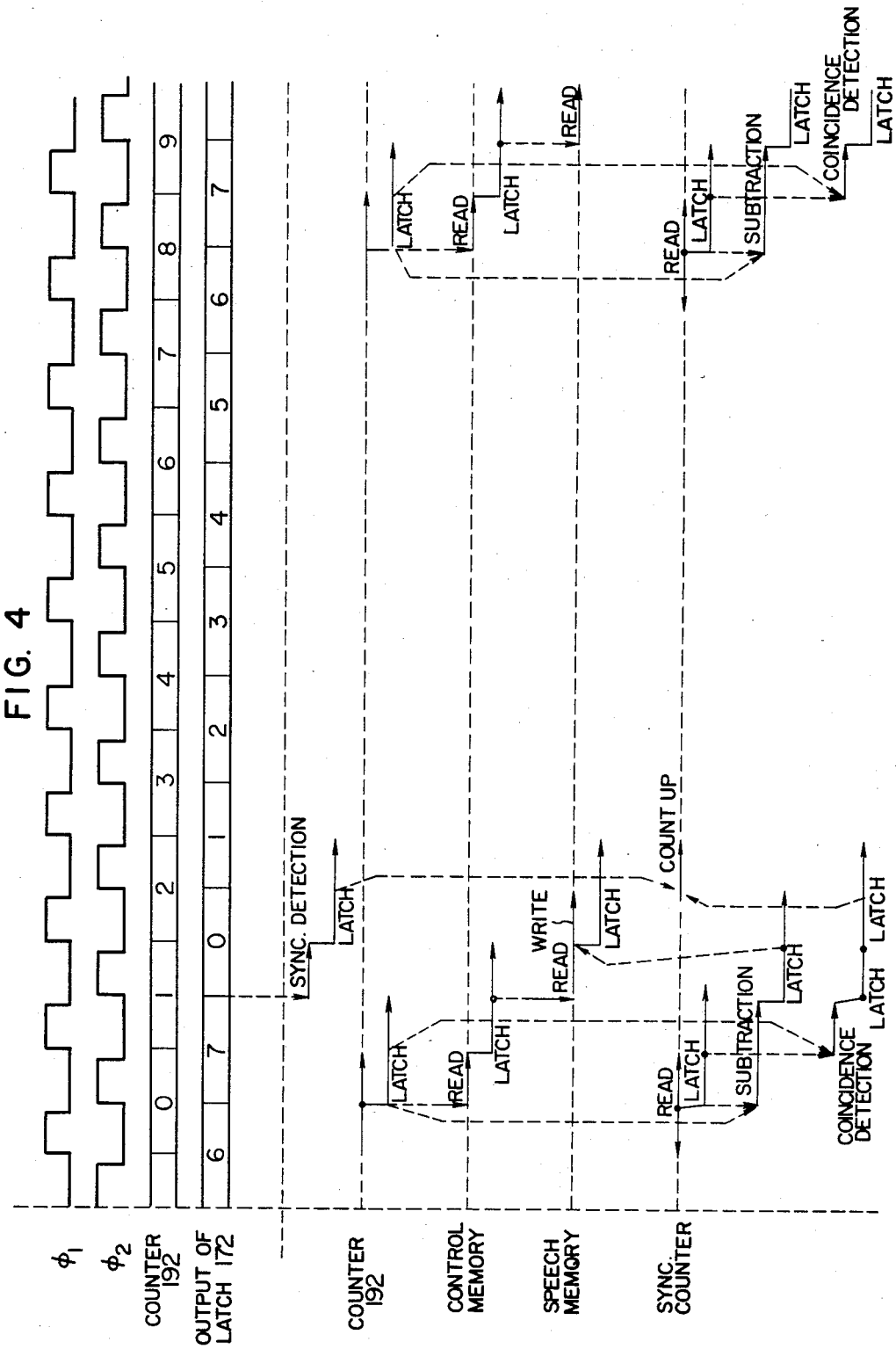
FIG. 4 is a time chart for illustrating an operation of a frame synchronization circuit of FIG. 1.

FIG. 4 shows a time chart for explaining timings in the frame synchronization circuit. The time-division switch is operated by basic clocks of two-phase clocks $\phi_1$ and $\phi_2$ of 8.192 MHz. The reference counter 192 L is incremented at the rising edge of the clock $\phi_1$ and varies within a range of 0 to 1023. The multiplexer 171 sequentially selects the input highways 100-107 by the low order three bits of the counter 192. The latch 172 produces the digital information of the input highways 0-7 as shown in FIG. 4. For the sake of easy understanding, a lower half of the time chart of FIG. 4 shows only for the highway 100. When the count of the reference counter 192 is 8 k (k is an integer), the control memory 181 is read by the output of the reference counter 192 and the counter in the counter control circuit 160 which corresponds to the input highway 100 is selected. The latch 130 latches the high order three bits of the output of the latch 188 to determine the delay of the variable delay shift register 110. On the other hand, the subtractor 180 subtracts the low order seven bits of the output of the latch 188 which is a frame synchronization correction value from the high order seven bits of the latch 186 to generate the write address to the speech memory 173. The counter control circuit 160 increments the count if necessary by the outputs of the synchronization detector 178 and the coincidence circuit 189 which have been time-adjusted by the latches 179, 190 and 191. The above operations are carried out in a pipeline fashion so that the frame synchronization for the all input highways is attained.

Figure 5:
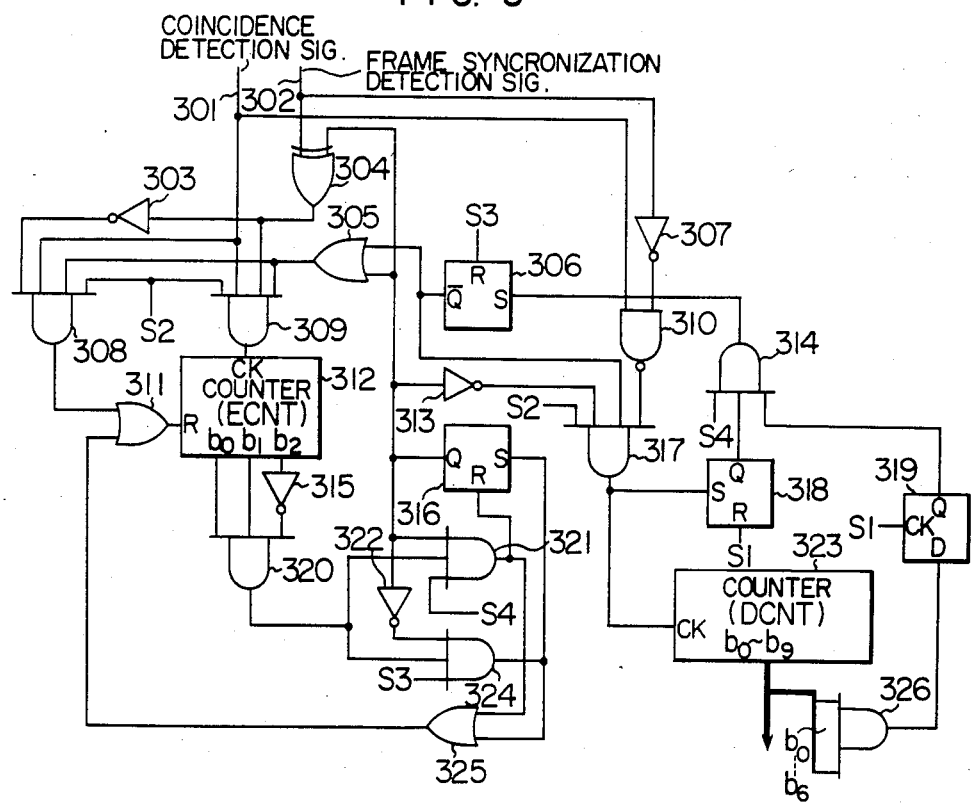
FIG. 5 shows one embodiment of a counter control circuit 160 of the frame synchronization circuit of FIG. 1.
Figure 6:
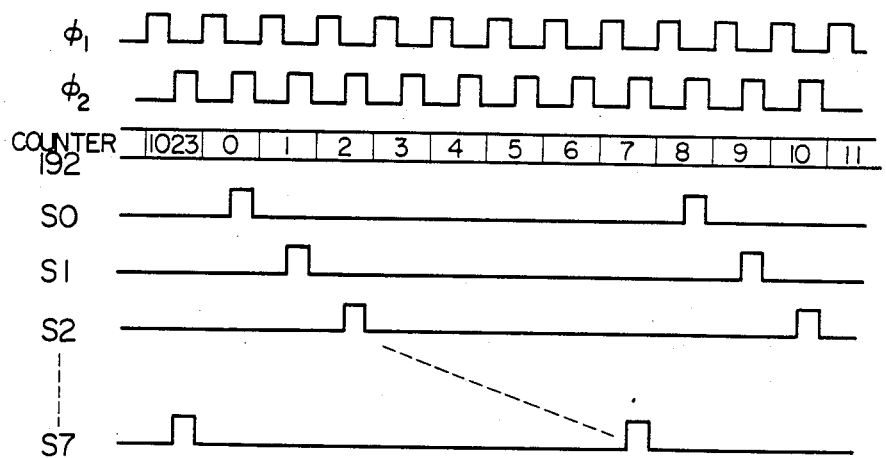
FIG. 6 is a time chart for illustrating an operation of FIG. 5.
Figure 7:
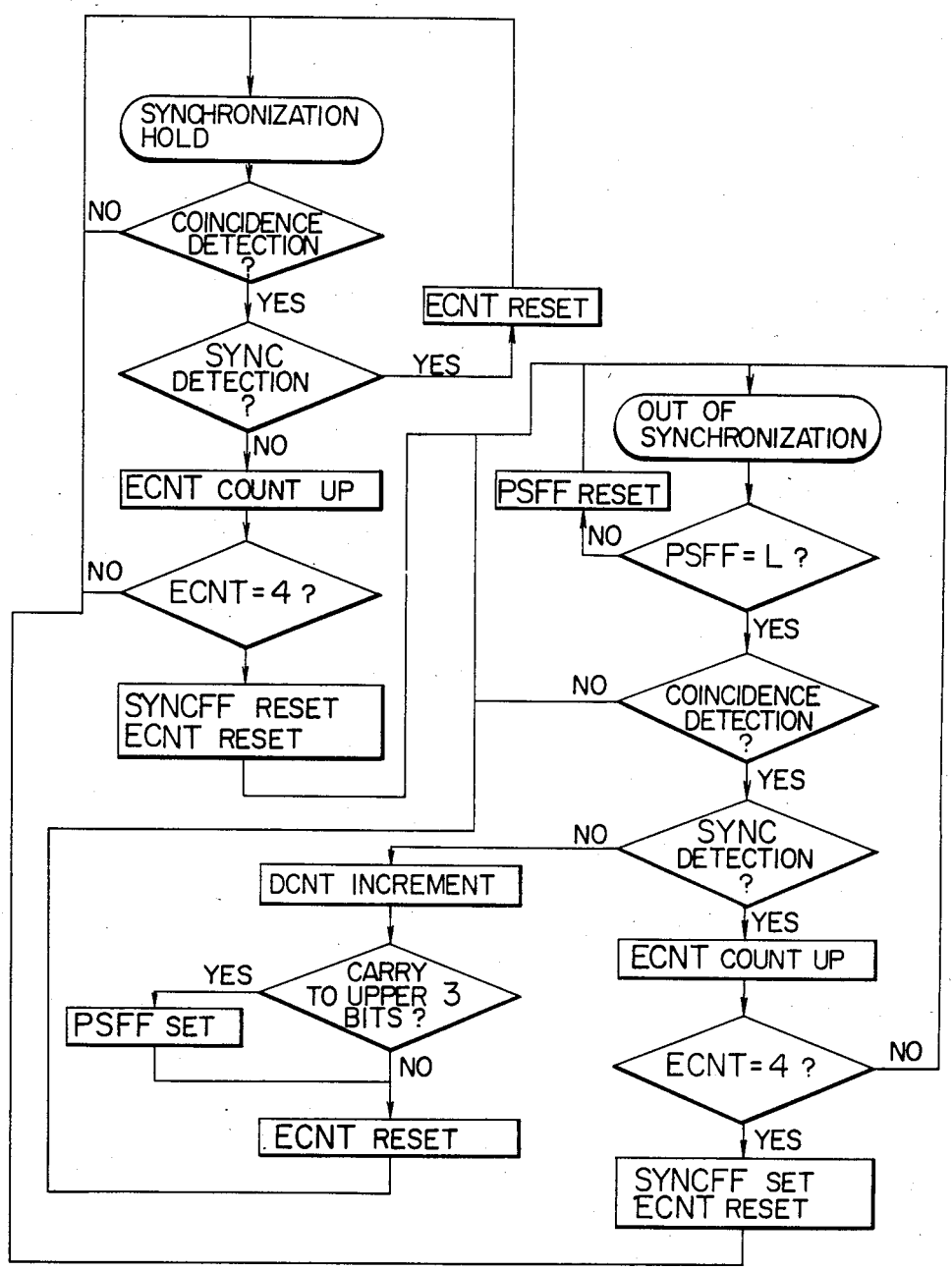
FIG. 7 is a flow chart for illustrating an operation of the counter control circuit of FIG. 5.

FIG. 5 shows a detail of the counter control circuit 160 (or 161-167), FIG. 6 shows a relation between timing signals Si ($0 \leq i \leq 7$) used in FIG. 5 and the clocks $\phi_1$ and $\phi_2$ and the output of the reference counter 192, and FIG. 7 shows a flow chart for the operation of the counter control circuit.

In FIG. 5, numeral 301 denotes the output of the latch 191 of FIG. 1, which is at H-level when the coincidence is detected. Numeral 302 denotes the output of the latch 179 of FIG. 1, which is at H-level when the synchronization pattern is detected. Numeral 316 denotes a flip-flop (SYNC FF) which indicates that the frame synchronization is in or out, numeral 312 denotes a counter (E CNT) for forward and backward protection, numeral 323 denotes a 10-bit counter (D CNT) for determining delays of the variable delay shift registers 110-117 of FIG. 1 and the modification amount of the write address to the speech memory 173, numerals 318 and 319 denote flip-flops for detecting a carry from the low order seven bits to the high order three bits of the counter 323, and numeral 306 denotes a flip-flop for inhibiting the increment of the counter 323 when the carry is detected. In the flip-flops 306, 316 and 318, S, R and Q denote a set input, a reset input and a data output, respectively, (for the RS flip-flops), and in the flip-flop 319, CK, D and Q denote a clock input, a data input and a data output, respectively, (for the D-type flip-flop).

Referring to FIG. 7, the operation of FIG. 5 is explained. In the synchronized state, the output of the SYNC FF 316 is at the H-level and the E CNT 312 is reset if the coincidence detection signal 301 is H-level and the synchronization detection signal is H-level. When the synchronization detection signal 302 is L-level, the synchronization pattern is not detected. In order to prevent the out-of-synchronization by a bit error by a noise of the transmission line (forward protection), it is regarded that the out-of-synchronization occurred if the count of the E CNT 312 reaches to count 4 in the count-up mode, and the SYNC FF 316 is reset. In the out-of-syhnchronization state, the counter 323 is incremented if the coincidence detection signal 301 is H-level and the synchronization detection signal 302 is L-level. If a change occurs in the high order three bits when the counter 323 is incremented, the delay of the variable delay shift register changes and the input digital information may be destroyed. Thus, the RS FF 306 is set to inhibit the operation of the counter control circuit eight-clock time interval later. The set signal of the RS FF 306 is produced by detecting that all of the low order seven bits of the counter 323 are "1" and the count-up signal was applied to the D CNT 323, by the AND gate 326 and the flip-flops 319 and 318 and supplying the detection signal to the AND gate 314 to AND with S4. When the synchronization detection signal 302 is H-level, the E CNT 312 is incremented and when the count reaches 4 (backward protection), the SYNC FF 316 is set to assume the synchronization hold status. The counter control circuit in FIG. 5 is for the input highway 100 and uses the timing signals S1-S4. By shifting the timing signals (for example, the signals S2-S5 for the input highway 101), the synchronization control circuits for the input highways 101-107 are constructed.

Figure 8:
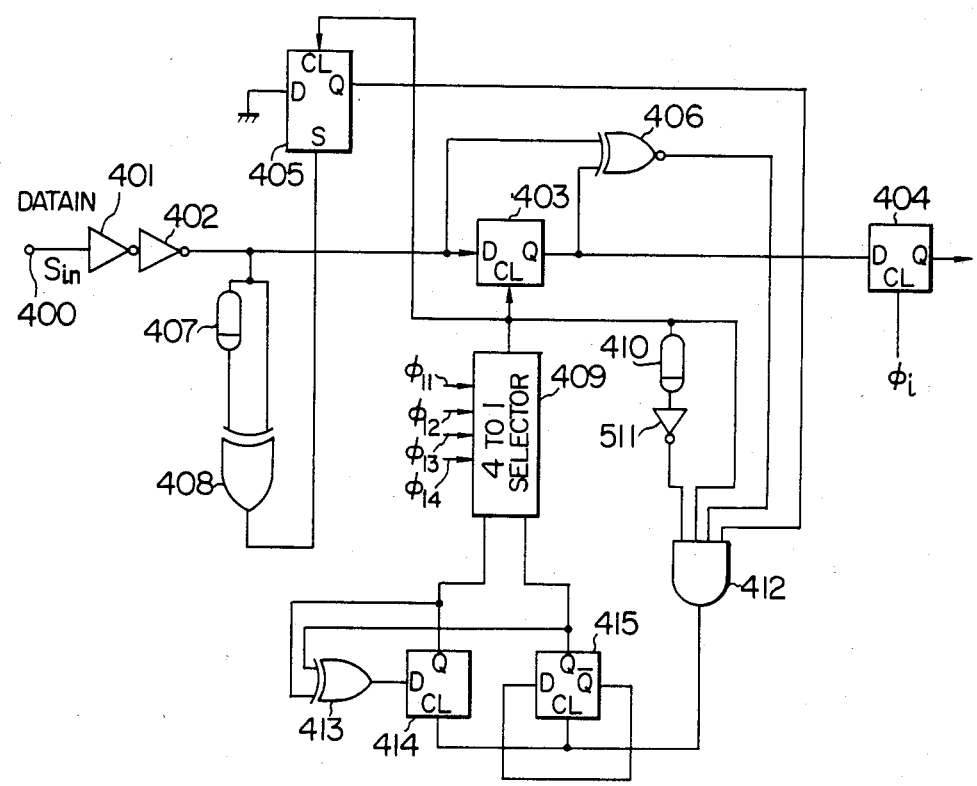
FIG. 8 shows one embodiment of a bit synchronization circuit in the embodiment of FIG. 1.

FIG. 8 shows an embodiment of the bit synchronization circuit 20 (or 21-27) of FIG. 1. In FIG. 8, numerals 401, 402 denote reshaping inverters, numerals 403, 404, 405, 414 and 415 denote D-type flip-flops, numerals 406 and 413 denote an Exclusive NOR gate and an Exclusive OR gate, respectively, numeral 410 denotes a delay circuit, numeral 411 denotes an inverter, numeral 412 denotes an AND gate and numeral 409 denotes a selector.

Figure 9:
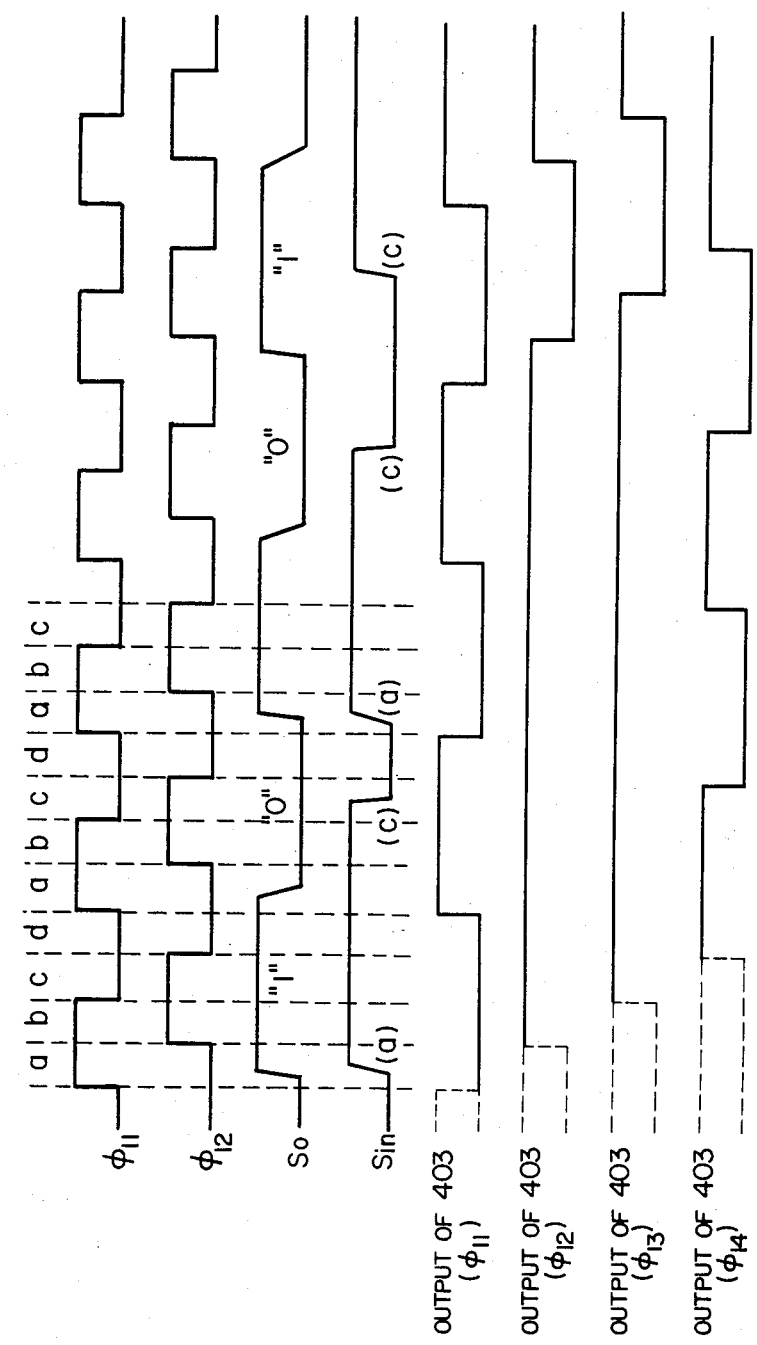
FIG. 9 is a time chart for illustrating an operation of the bit synchronization circuit of FIG. 8.

FIG. 9 shows a time chart for explaining the operation of FIG. 8.

An NRZ (non-return to Zero) input signal Sin is applied to an input terminal 400 from the input highway. The signal Sin shown indicates "10101". When no jitter is included, the signal Sin should have a waveform S0.

Figure 10:
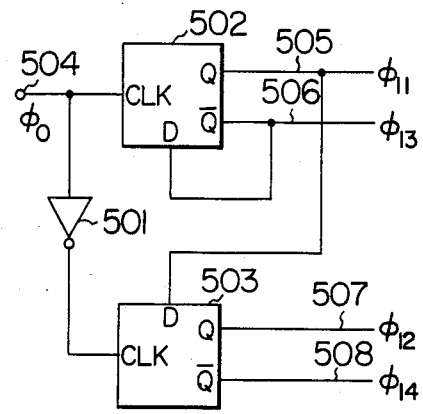
FIG. 10 shows one embodiment of a clock signal generator used in the circuit of FIG. 8.
Figure 11:
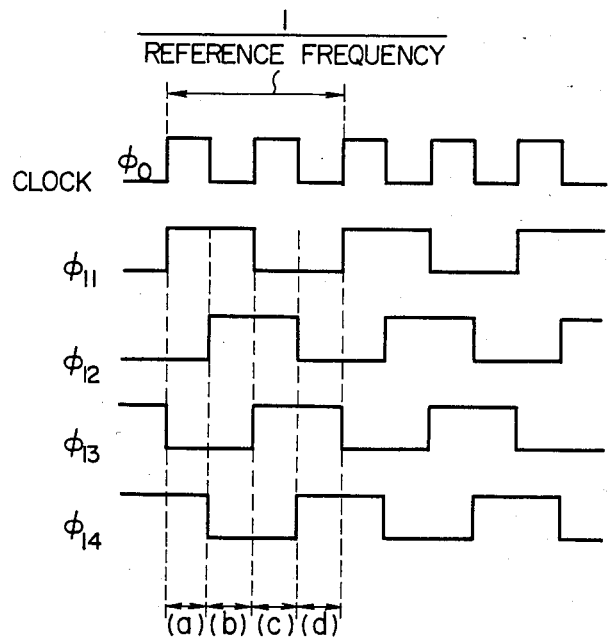
FIG. 11 shows signal waveforms of the circuit of FIG. 10.

In FIG. 8, the input signal is applied to the reshaping inverters 401 and 402 which produce the signal Sin. The selector 409 selects one of clock signals $\phi_{11}$, $\phi_{12}$, $\phi_{13}$ and $\phi_{14}$ having a phase difference of ¼ period from each other, as shown in FIG. 11. The four clock signals may be produced by a circuit shown in FIG. 10. A reference clock signal $\phi_0$ (16.384 MHz) is applied to an input terminal 504 and one portion thereof is supplied to a clock terminal CLK of a D-type flip-flop 502 and the other portion is supplied to a clock terminal CLK of a D-type flip-flop 503 through an inverter 501. Terminal $\overline{Q}$ of the respective flip-flops 502 and 503 are connected to their data input terminals D.

When the signal is S0, no error occurs with any of the clock signals $\phi_{11}$, $\phi_{12}$, $\phi_{13}$ and $\phi_{14}$. However, when the jitter is included as shown by the signal Sin, an error may occur depending on the latch phase.

In the bit phase synchronization circuit shown in FIG. 8, the flip-flop 405 is set at a transition point of the input signal Sin and reset at a rising edge of the output of the selector 409. Accordingly, the output of the flip-flop 403 is "H" if the input signal changes within one period of the reference frequency at the time of the rising edge of the output of the selector 409. If the output of the flip-flop 405 is "H" at the rising edge of the output of the selector 409, that is, when the flip-flop 403 reads in the signal, the input and the output of the flip-flop 403 must be different from each other. Accordingly, it may be used as a reference to the clock selection. If the output of the flip-flop 405 is "H" at the rising edge of the output of the selector 409 and the input and the outputs of the flip-flop 403 are at the same logical level, the output of the AND gate 412 is "H". (The duration of "H" is equal to a sum of the delays of the delay circuit 410 and the inverter 411.) On the other hand, the flip-flops 414 and 415 and the Exclusive OR gate 413 form a 2-bit counter which is incremented at the rising edge of the input clock. Accordingly, if the clock (e.g. clock $\phi_{12}$ or $\phi_{13}$ in FIG. 9) by which the input signal is not correctly received is selected by the selector 409, the counter comprised of the flip-flops 414 and 415 and the Exclusive OR gate 413 is incremented so that the clock by which the input signal is correctly received is finally selected.

While the circuits are triggered at the rising edge of the clock in the illustrated embodiment, the same operation can be accomplished when the circuits are triggered at the falling edge of the clock.

Figure 12:
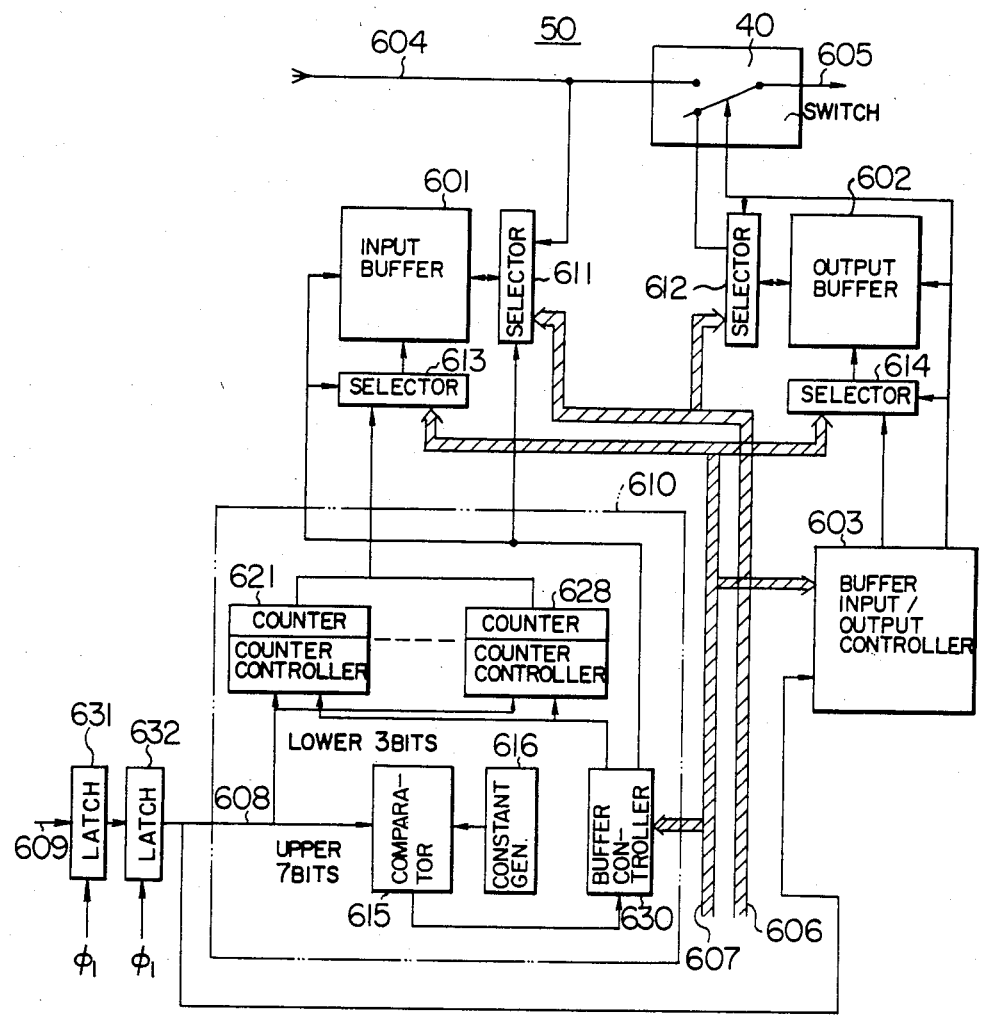
FIG. 12 shows one embodiment of a control information transceiver in the embodiment of FIG. 1.

FIG. 12 shows an embodiment of the control information transceiver of FIG. 1. Parallel lines 604 and 605 are connected to the latch 174 and the demultiplexer 30 in FIG. 1, respectively, and parallel lines 606 and 607 are connected to the address bus and the data bus, respectively, of the microprocessor 60 of FIG. 1. Line 609 is connected to the reference counter 192 of FIG. 1. Latch circuits 631, 632 delay the reference counter output by two clock periods to compensate the time lag between the reference counter output 609 and the latch output 604, as shown in FIG. 4.

The transmission and reception of the control information through the channel 64 of the highways are now explained.

As described above, when the frame synchronization of the time-division switching unit is in order, the signals of the respective channels of the respective highways are orderly stored as shown in FIG. 3A. The control information is stored at addresses $8i+j$ ($i=64$, $j=0-7$), that is, address 512-519 of the speech memory. Accordingly, when the control information is on the line 604, the lines 604 and 605 are disconnected by the control signals from the buffer input/output control circuits 610 and 603 and the control information from the line 604 is stored at a predetermined address position of the input buffer through the selector 611 and new control information stored in the output buffer is sent out to the output line 605 (output highway) through the selector 612.

When the ten bits of the latch output 608 change from "1000000000" ($=512$) to "1000000111" ($=519$), that is, when the high order seven bits reach "1000000" ($=64$), the output of the latch 174 is written into the input buffer 601 and the control information in the output buffer 602 is read out through the switch 40. The high order seven bits of the latch output 608 are compared with the output of a constant generator 616 which generates a constant 64, by a comparator 615, and if they are equal, the output of the latch 174 is written into the input buffer 601 and the timing to read out the control information stored in the output buffer 108 is determined.

Since the control information is usually transmitted a plurality of bytes at a time and the input/output buffers are shared by the eight highways (with different memory areas for the respective highways), the write and read address control is necessary. If a maximum transmission unit of the control information is 32 bytes, the memory areas of the input/output buffers may be allocated as shown in FIG. 13. Thus, the input/output buffers are accessed by the 8-bit address and the memory area of the highway is determined by the high order three bits while the order of the 32 bytes is determined by the high order three bits. In FIG. 12, counter and counter control circuits 621-628 are provided one for each of the highway and the low order three bits of the output of the latch 632 are supplied to the counter control circuits. Those three bits identify the highway whose control information is read from the speech memory.

The operation of the buffer input/output control circuits 610 and 603 is now explained in detail. The high order seven bits of the output 608 of the latch 632 and the output of the constant generator 616 are compared by a comparator 615 and the compare result is supplied to a buffer control circuit 630. When the inputs to the comparator 615 are equal, the buffer control circuit 630 supplies a signal of H-level to the counter control circuits 621-628 and causes the selector 611 to select the latch output 604. The counter control circuit receives the output of the buffer control circuit 630 and reads out the content of the counter when the low order three bits of the latch output 608 are equal to the corresponding highway number. The counters 621-628 are 5-bit counters (to specify addresses of the input/output buffers corresponding to the highways) and take the low order three bits of the output of the latch 632 as the high order bits to supply the 8-bit addresses to the input/output buffers. After the writing to the input buffer, the counter 621-628 which supplied the write address is incremented to be ready to the reception of the next control information.

The input/output buffers 601 and 602 can be accessed by the external processor through the data bus 606 and the address bus 607. The access is carried out by detecting the access from the external to the input/output buffer by the buffer control circuit and selecting the bus by the selectors 611, 612, 613 and 614. The counter corresponding to the highway control information read out this time is reset to be ready for the reception of the next control information.

The buffer input/output control circuit 603 is of the same construction as the control circuit 610 except that it controls the switch 40. The buffer empty/busy control is actually carried out in the control circuits 603, 610 although it is not explained here because it is not directly related to the present invention.

In the illustrated embodiment, the control memory is set such that the channel 64 of the input highway is connected to the channel 64 of the same highway. By modifying the above, the control information at any position of the highway can be supplied to the buffer so that a highly flexible communication control circuit is constructed. While only one channel is used for the control information in the illustrated embodiment, a plurality of channels may be used. For example, the comparator 615 may compare only the high order five bits of the latch 632 so that the four channels 64–67 are used for the control information.

The output of the counter may be used as the write address to the speech memory and the read address to the control memory and the output of the control memory may be used as the read address to the speech memory.

We claim:

1. A time-division switching unit for writing into first memory means signals of a plurality of input highways including time-division multiplexed signals of a plurality of channels in one frame and connecting a desired channel of a desired one of said plurality of input highways to a desired channel of a desired one of a plurality of output highways by controlling write and read addresses to said first memory means, comprising:
    (a) a plurality of bit synchronization circuits provided one for each of said plurality of input highways;
    (b) multiplexer means for multiplexing outputs of said bit synchronization circuits;
    (c) address control means for controlling addresses to write and read the output of said multiplexer means to and from said first memory means;
    (d) distribution means for distributing signals read from said first memory means to said plurality of output highways;
    (e) frame synchronization signal detecting means for detecting a frame synchronization signal of the input highway from the input of said first memory means; and
    (f) a frame synchronization circuit for modifying the write address determined by said address control means in accordance with the output of said frame synchronization signal detecting means and variably delaying the signals of said input highways within a range of one channel period.

2. A time-division switching unit according to claim 1 wherein said frame synchronization circuit includes a plurality of first counters provided one for each of said plurality of input highways, a coincidence circuit for sequentially selecting said plurality of first counters by an output of a reference counter in said address control means and comparing a count of the selected first counter with a count of said reference counter, a plurality of counter control circuits provided one for each of said plurality of first counters adapted to be activated by the output of said frame synchronization signal detecting means and the output of said coincidence circuit, address modification means for modifying the count of said reference counter by the outputs of said first counters to generate a write or read address signal to said first memory means, and a plurality of variable delay means provided one for each of said plurality of highways for variably delaying input signals thereto within one channel period by the outputs of said first counters.

3. A time-division switching unit according to claim 1, wherein said bit synchronization circuit includes clock generation means for generating four clock signals each having the same bit rate as a transmission bit rate of said highways and having different phase from each other, clock selection means for selecting one of said four clock signals, first memory means for reading and holding the input data of the input highway at rising or falling edge of the clock signal selected by said clock selection means, second memory means for reading and holding the output of said first memory means, and means for controlling said clock selection means such that the input and the output of said second memory means assume different logical levels from each other when the input signal changes in one period of the bit rate of said highway before the clock signal supplied to said second memory means rises or falls.

4. A time-division switching unit according to claim 2, wherein said bit synchronization circuit includes clock generation means for generating four clock signals each having the same bit rate as a transmission bit rate of said highways and having different phase from each other, clock selection means for selecting one of said four clock signals, first memory means for reading and holding the input data of the input highway at rising or falling edge of the clock signal selected by said clock selection means, second memory means for reading and holding the output of said first memory means, and means for controlling said clock selection means such that the input and the output of said second memory means assume different logical levels from each other when the input signal changes in one period of the bit rate of said highway before the clock signal supplied to said second memory means rises or falls.

5. A time-division switching unit according to claim 1, further comprising:
    first buffer means for extracting control information from a specified channel of the input highway from said first memory means and holding the control information therein;
    second buffer means for adding the output highway control information to a specified channel of the output of said first memory means; and
    an interface circuit for exchanging signals among at least said first and second buffer means and an external processor.

6. A time-division switching unit according to claim 2, further comprising:
    first buffer means for extracting control information from a specified channel of the input highway from said first memory means and holding the control information therein;
    second buffer means for adding the output highway control information to a specified channel of the output of said first memory means; and
    an interface circuit for exchanging signals among at least said first and second buffer means and an external processor.

7. A time-division switching unit according to claim 3, further comprising:
    first buffer means for extracting control information from a specified channel of the input highway from said first memory means and holding the control information therein;
    second buffer means for adding the output highway control information to a specified channel of the output of said first memory means; and an interface circuit for exchanging signals among at least said first and second buffer means and an external processor.

8. A time-division switching unit according to claim 4, further comprising:
first buffer means for extracting control information from a specified channel of the input highway from said first memory means and holding the control information therein;
second buffer means for adding the output highway control information to a specified channel of the output of said first memory means; and
an interface circuit for exchanging signals among at least said first and second buffer means and an external processor.

9. A time-division switching unit according to claim 5, wherein said first buffer means includes an input buffer memory and a first buffer input/output control circuit for detecting the specified channel position of the control information supplied from the input highway of the output of said first memory means by at least a portion of the output of said reference counter and writing the control information supplied from said input highway into a specified position of said input buffer memory, and said second buffer means includes an output buffer memory and a second buffer input/output control circuit for adding the control information stored in said output buffer memory to the specified channel position of the output of said first memory means by at least a portion of the output of said reference counter.

10. A time-division switching unit according to claim 6, wherein said first buffer means includes an input buffer memory and a first buffer input/output control circuit for detecting the specified channel position of the control information supplied from the input highway of the output of said first memory means by at least a portion of the output of said reference counter and writing the control information supplied from said input highway into a specified position of said input buffer memory, and said second buffer means includes an output buffer memory and a second buffer input/output control circuit for adding the control information stored in said output buffer memory to the specified channel position of the output of said first memory means by at least a portion of the output of said reference counter.

11. A time-division switching unit according to claim 7, wherein said first buffer means includes an input buffer memory and a first buffer input/output control circuit for detecting the specified channel position of the control information supplied from the input highway of the output of said first memory means by at least a portion of the output of said reference counter and writing the control information supplied from said input highway into a specified position of said input buffer memory, and said second buffer means includes an output buffer memory and a second buffer input/output control circuit for adding the control information stored in said output buffer memory to the specified channel position of the output of said first memory means by at least a portion of the output of said reference counter.

12. A time-division switching unit according to claim 8, wherein said first buffer means includes an input buffer memory and a first buffer input/output control circuit for detecting the specified channel position of the control information supplied from the input highway of the output of said first memory means by at least a portion of the output of said reference counter and writing the control information supplied from said input highway into a specified position of said input buffer memory, and said second buffer means includes an output buffer memory and a second buffer input/output control circuit for adding the control information stored in said output buffer memory to the specified channel position of the output of said first memory means by at least a portion of the output of said reference counter.

13. A time-division switching unit for writing into first memory means signals of a plurality of input highways including time-division multiplexed signals including a control information channel in one frame and controlling write and read addresses to said first memory means to connect a desired channel of a desired one of said plurality of input highways to a desired channel of a desired one of a plurality of output highways, comprising:
(a) multiplexer means for time-division multiplexing the time-division multiplexed from said plurality of input highways;
(b) address control means for controlling addresses to write and read the output of said multiplexer means to and from said first memory means;
(c) distribution means for distributing the signals read from said first memory means to said plurality of output highways;
(d) a frame synchronization circuit including frame synchronization signal detecting means for detecting frame synchronization signals of the input highways from the inputs of said first memory means, and means for modifying the write address determined by said address control means by the output of said frame synchronization signal detecting means and variably delaying the signals of said input highways within one channel period;
(e) a control information transceiver including:
an input buffer;
a first input/output buffer control circuit for detecting a specified channel position of the control information of the input highway from the output of said first memory means by at least a portion of an output of a reference counter for said address control means and writing the control information of said input highway into a specified position of said input buffer;
an output buffer; and
a second input/output buffer control circuit for sending out the control information stored in said output buffer to a specified channel position of the output of said first memory means by at least a portion of the output of said reference counter; and
(f) a processor for reading out the control information of the input highway written in said input buffer and writing into said output buffer the control information to be sent out to said output highway.

14. A time-division switching unit according to claim 13, wherein said first and second input/output buffer control circuits each includes a plurality of first counters provided on for each of said plurality of output highways, a constant generator, a comparator for comparing the count of said reference counter with a constant of said constant generator, a plurality of counter control circuits provided one for each of said plurality of first counters for selecting one of said plurality of first counters by the output of said comparator and a portion of the output of said reference counter, and means for determining an address of said input buffer memory or said output buffer memory by the outputs of said first counters.

15. A time-division switching unit according to claim 13, wherein said frame synchronization circuit includes a plurality of second counters provided one for each of said plurality of input highways, a coincidence circuit for sequentially selecting said plurality of second counters by the output of said reference counter and comparing the count of the selected second counter with the count of said reference counter, a plurality of second counter control circuits provided one for each of said plurality of second counters adapted to be activated by the output of said frame synchronization signal detecting means and the output of said coincidence circuit, address modification means for modifying the count of said reference counter by the output of said second counter to generate the write or read address signal to said first memory means, and a plurality of variable delay means provided one for each of said plurality of input highways for variably delaying the input signals thereto within one channel period by the outputs of said second counters.

* * * * *